US005110382A

United States Patent [19]

Terry et al.

[11] Patent Number: 5,110,382

[45] Date of Patent: May 5, 1992

[54] METHOD FOR MAKING A ROLLER ASSEMBLY FOR GRAIN SHELLERS

[75] Inventors: Jimmy C. Terry, Spring; John A. Mrosko, Katy, both of Tex.

[73] Assignee: F. H. Maloney, Houston, Tex.

[21] Appl. No.: 602,117

[22] Filed: Oct. 23, 1990

Related U.S. Application Data

[62] Division of Ser. No. 517,576, May 1, 1990.

[51] Int. Cl.[5] .......... B32B 5/18

[52] U.S. Cl. .......... 156/77; 156/215; 156/513; 156/242; 264/156; 264/273; 264/274; 29/110; 29/130; 29/132; 99/617; 99/620

[58] Field of Search .......... 29/110, 130, 132; 99/617, 620; 156/513, 215, 77, 242; 264/156, 273, 274

[56] References Cited

U.S. PATENT DOCUMENTS

| | | | |
|---|---|---|---|
| 2,685,548 | 8/1954 | Drozdowski . | |
| 3,626,774 | 12/1971 | Schon | 264/274 |
| 3,891,739 | 6/1975 | Lawson | 264/156 |
| 4,256,034 | 3/1981 | Kusters et al. . | |
| 4,416,201 | 11/1983 | Kessler . | |
| 4,517,719 | 5/1985 | Okumura et al. . | |
| 4,576,845 | 3/1986 | Krotchko | 29/110 |
| 4,662,274 | 5/1987 | Nonomiya et al. . | |
| 4,815,370 | 3/1989 | Collins . | |

*Primary Examiner*—Caleb Weston
*Assistant Examiner*—Francis J. Lorin
*Attorney, Agent, or Firm*—Lorusso & Loud

[57] ABSTRACT

A method for making a roller sleeve assembly comprising providing a metal sleeve, forming apertures extending radially through the sleeve, bonding a flexible sleeve to the exterior of the metal sleeve and permitting the flexible sleeve material to fill certain of the apertures. The invention further contemplates a method for making a roller assembly comprising sliding the above-described sleeve assembly onto a hub comprising a circular wall with ribs extending normally therefrom, and providing locking plates and cooperative pins for locking the sleeve assembly onto the hub, with the pins disposed partly in the locking plates and partly in other of the sleeve assembly apertures.

9 Claims, 5 Drawing Sheets

METHOD FOR MAKING A ROLLER ASSEMBLY FOR GRAIN SHELLERS

CROSS-REFERENCE TO RELATED APPLICATION

This is a division of application Ser. No. 07,517,578, filed May 1, 1990 in the name of Jimmy C. Terry and John A. Mrosko.

BACKGROUND OF THE INVENTION

1. Field of the Invention

This invention relates to grain shelling apparatus and is directed more particularly to a method for making a roller assembly for rice pressing apparatus of the type having twin rollers.

2. Description of the Prior Art

The rice milling process includes a shelling procedure in which the hull or husk is removed from the kernel. The shelling procedure follows cleaning the rough rice and serves to remove the course husk from the kernel by use, in most cases, of a set of rubber roll shellers.

Rubber-surfaced rolls are disposed in parallel with a desired space therebetween and, in operation, are rotated toward each other as rough rice is fed between them. The rollers act to gently remove the husk, leaving the endosperm substantially intact. Thereafter, the kernel may be further refined.

The roll generally employed includes a hollow steel sleeve with a rubber surface. The life expectancy of the roll is relatively short, something on the order of less than three working days. When a roll has deteriorated to the point at which it requires replacement, the shelling apparatus must be shut down and the rolls removed and replaced. In view of the short life span for rolls, the "down time" of shelling apparatus is a problem.

Accordingly it would be beneficial to the industry to have available a roll with an improved life expectancy and with a capability for quick and easy replacement.

An object of the present invention is, therefore, to provide a method for making a roller assembly in which the milling, or shelling, portions are readily disconnected from the driving portion and replaced with minimal "down time".

Another object of the invention is to provide a method for making a roller assembly having enhanced cooling capabilities, so as to reduce deterioration of the shelling portions and thereby lengthen the time period between replacements of the shelling portions.

SUMMARY OF THE INVENTION

With the above and other objects in view, as will hereinafter appear, a feature of the present invention is the provision of a method for fabricating a roller assembly including the steps of providing a metal sleeve, forming first and second apertures in the metal sleeve, bonding a sleeve of flexible material to the exterior of the metal sleeve, with the flexible material entering and filling the first apertures, shielding the second apertures to prevent flow of the flexible material into the second apertures, to provide a laminate sleeve assembly with parts of the flexible sleeve material extending through the metal sleeve to the interior surface of metal sleeve and providing a mounting hub comprising a circular wall having ribs extending from the wall and substantially normal thereto, sliding the sleeve assembly onto the ribs, providing locking plates adapted for connection to the wall and having recess means therein alignable with the sleeve assembly second apertures, locating pins in the locking plate recess means, disposing the locking plates such that the pins enter the sleeve assembly second apertures, and fixing the locking plates to the wall whereby to connect the sleeve assembly to the mounting hub.

In accordance with a still further feature of the invention, there is provided a method for making a roller assembly having a flexible sleeve of polyurethane, the polyurethane sleeve having a wall thickness of about 0.375–0.5 inch, the assembly having a metal sleeve of a wall thickness of about 0.312 inch, the polyurethane sleeve being bonded to a lengthwise surface of the metal sleeve and being coextensive with the metal sleeve, the wall thickness of the polyurethane sleeve facilitating rapid transfer of heat to the metal sleeve and thence to the atmosphere.

The above and other features of the invention, including various novel details of construction and combinations of parts, will now be more particularly described with reference to the accompanying drawings and pointed out in the claims. It will be understood that the particular devices and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

Description of the Preferred Embodiment

Figure 1:
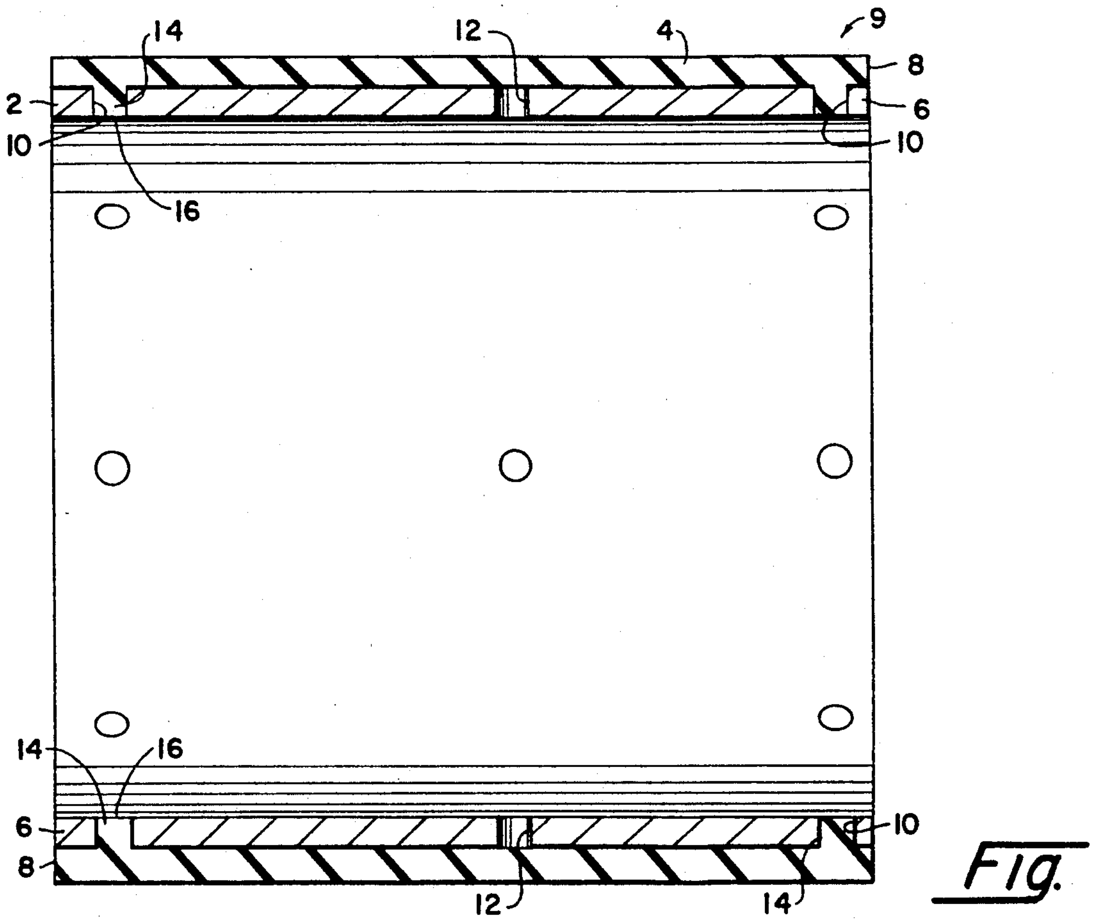
FIG. 1 is a centerline sectional view of one form of a roller sleeve assembly made in accordance with a method illustrative of an embodiment of the invention.
Figure 2:
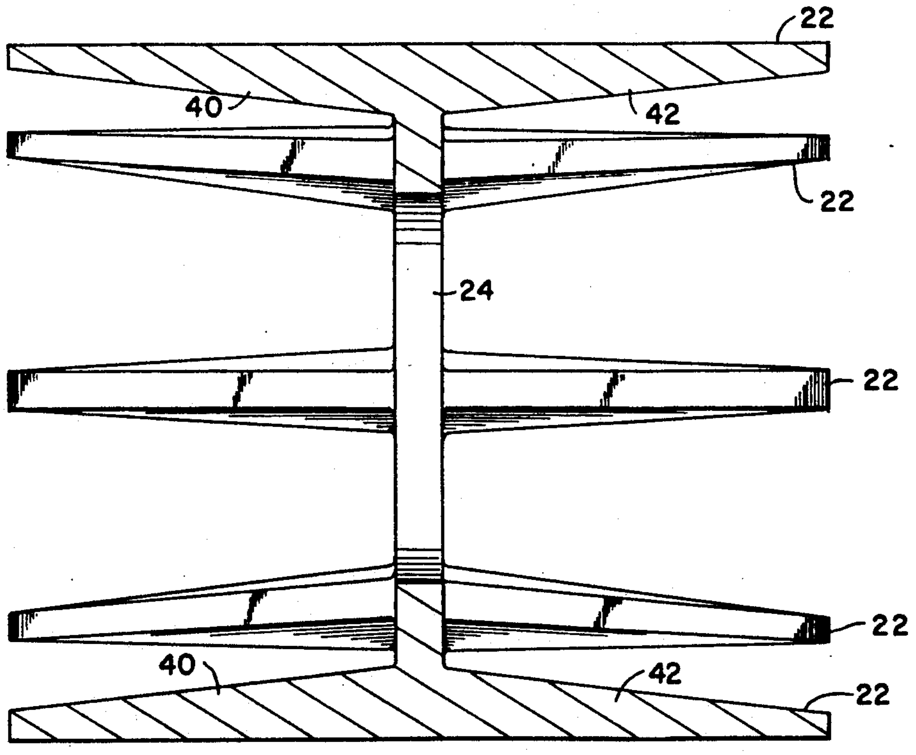
FIG. 2 is a centerline sectional view of a hub component of a roller assembly made in accordance with a method illustrative of an embodiment of the invention.
Figure 3A:
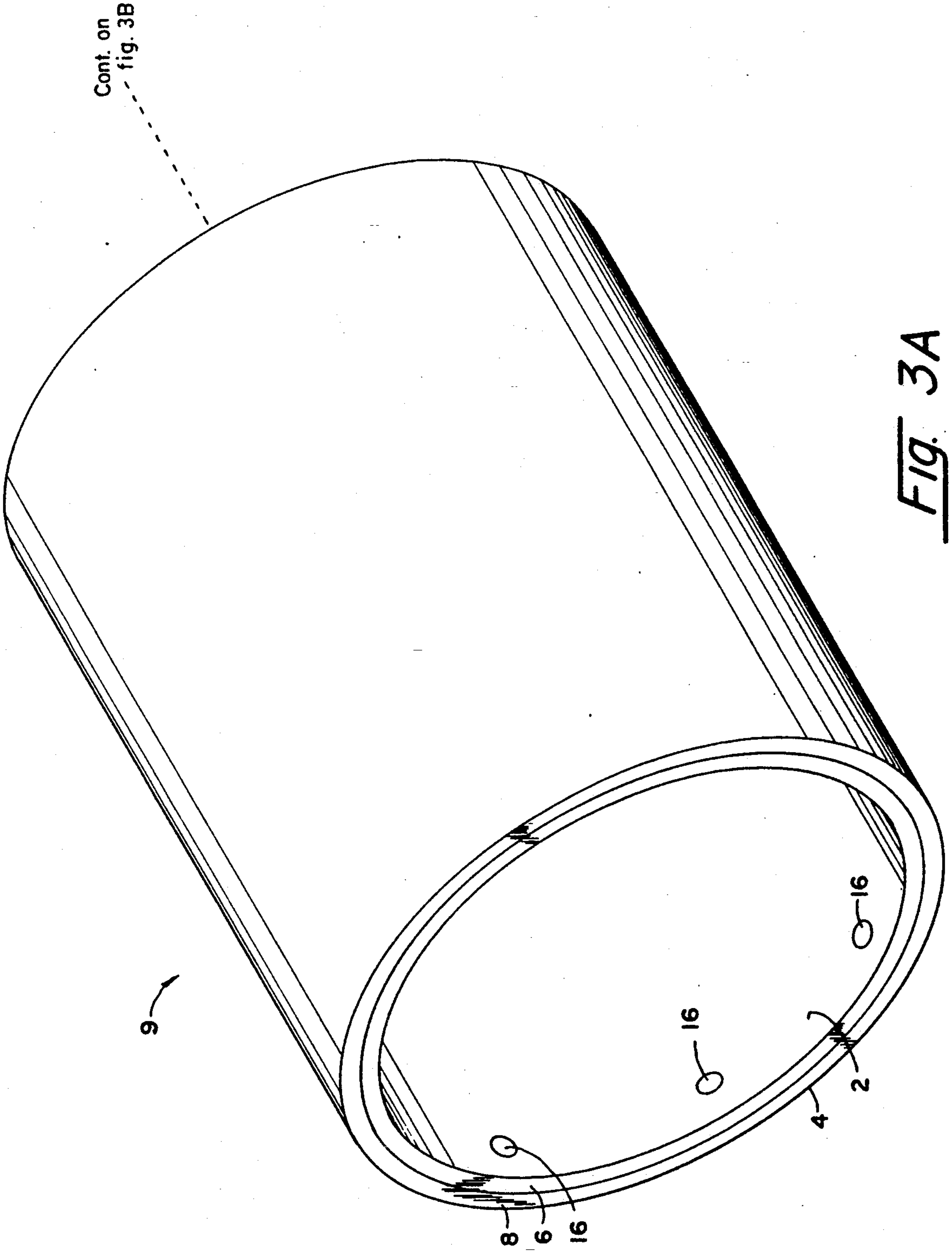
FIG. 3A is a perspective view showing a roller sleeve assembly including the components shown in FIG. 1.
Figure 3B:
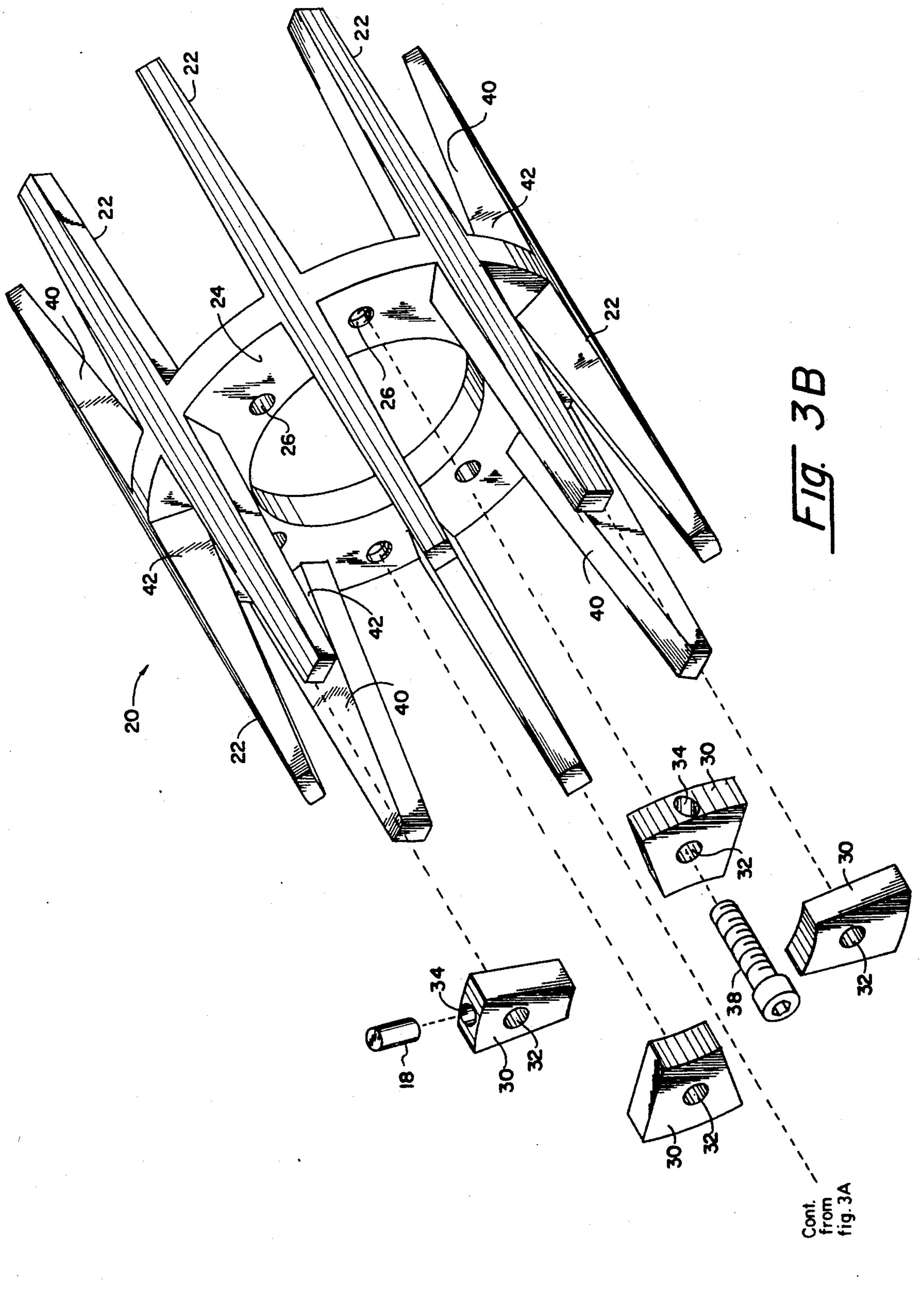
FIG. 3B is an exploded perspective view of a hub and locking plate assembly including the component shown in FIG. 2.
Figure 5:
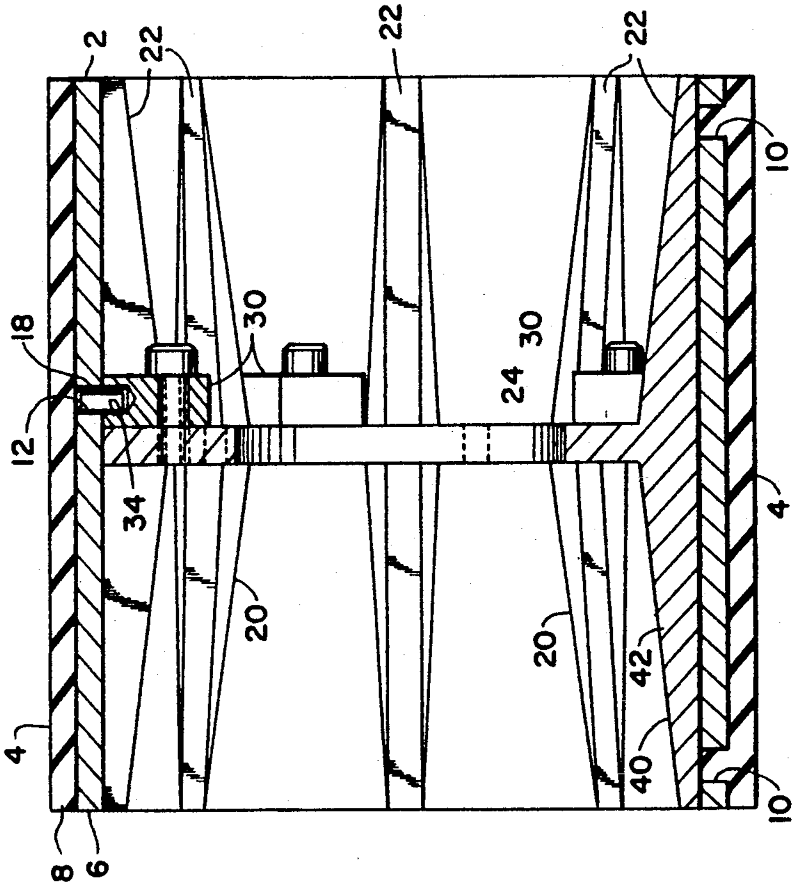
FIG. 5 is a sectional view taken along line V—V of FIG. 4.
Figure 4:
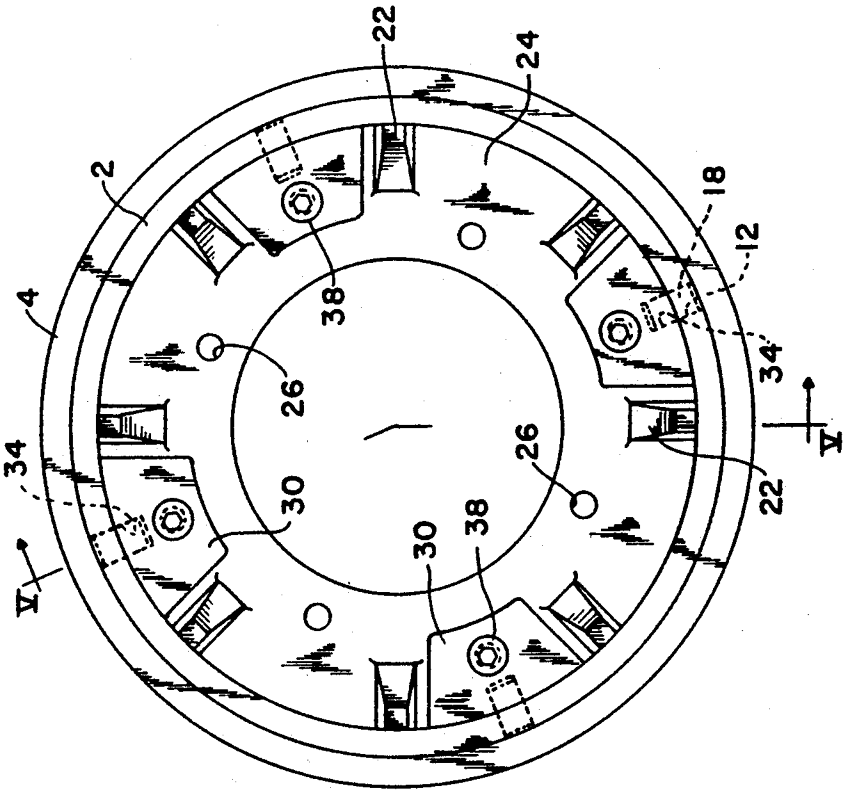
FIG. 4 is an end view of the roller assembly.

Referring to the drawings, it will be seen that an illustrative embodiment of the invention includes a first round tubular sleeve 2 which is of a rigid material, preferably a metal of high thermal conductivity, such as aluminum. Bonded to the lengthwise outer surface of the first sleeve 2 is a second sleeve 4 of a hard flexible material, preferably a polymer, such as polyurethane. The two sleeves 2, 4 are coextensive, that is, they are of equal length and precisely aligned such that their respective ends 6, 8 are flush with each other to provide essentially a laminate sleeve assembly 9.

The metal sleeve 2 is provided with first and second apertures 10, 12 which extend radially through the metal sleeve. Portions 14 of the flexible sleeve 4 extend into the metal sleeve first apertures 10. Such arrangement assists in bonding the flexible sleeve 4 onto the metal sleeve 2 and also serves to expose parts 16 of the flexible sleeve to the interior of the metal sleeve 2 to assist, in operation, in cooling the flexible sleeve. The second apertures 12 of the metal sleeve 2 are adapted to receive pins 18 extending from mounting hub 20, as will be described below.

In fabrication of the sleeve assembly 9, the first and second apertures 10, 12 are drilled radially through the metal sleeve 2. In bonding the flexible material sleeve 4 to the metal sleeve 2, the first apertures 10 are left open so that the flexible material may flow into and fill the first apertures, and the second apertures 12 are shielded to prevent flow of the flexible material thereinto. Upon completion of the bonding step, the shielding (not shown) is removed so that the second apertures will be available for use in connecting the sleeve assembly to the mounting hub.

The mounting hub 20 comprises a series of ribs 22 extending from an annular wall 24. The ribs 22 are arranged in a spaced circular configuration so as to be adapted to slidably receive the metal sleeve 2 exteriorly of the ribs 22. In the embodiment shown, the ribs 22 are coextensive with the sleeve assembly 9 for maximum support. The wall 24 extends widthwise and substantially normally of the axially extending ribs. The wall 24 is provided with axially extending holes 26.

The assembly further includes locking plates 30 adapted to lock the metal sleeve 2 to the wall 24. The locking plates 30 are provided with holes 32 adapted for alignment with the wall holes 26, and recess means 34 adapted for alignment with the metal sleeve second apertures 12. The pins 18 are adapted for disposition in the locking plate recess means 34 and the metal sleeve second apertures 12. The locking plates 30 may be connected to the wall 24 by bolts 38 extending through the locking plate holes 32 and the wall holes 26. Thus secured, the sleeve assembly 9 is fixed to the mounting hub 20 such that there can be no longitudinal or rotational movement of the sleeves relative to the hub.

As noted above, the ribs 22 protrude axially from the wall 24 and define a circumference adapted to slidably receive the metal sleeve 2. As such, the ribs 22 serve as a critical part of the mounting hub, the part upon which the sleeve 2 is mounted. The ribs 22 are formed so as to perform a second valuable function. One or more of the ribs 22 are provided with a shaped extension 40 increasing the area of the rib and providing vane means 42 internally of the assembly. In rotation of the sleeve assembly, the vane means 42 operate to create air turbulence centrally of the assembly, to assist in cooling the metal sleeve 2 and the flexible sleeve 4 directly through the flexible sleeve parts 16 exposed to the interior of the metal sleeve and indirectly by cooling of the metal sleeve. In the embodiment illustrated, the vane means 42 comprise portions 40 of the ribs 22, the portions 40 extending from the wall 24 and the ribs 22. However, it will be apparent that the vane means 42 could comprise surfaces extending from the wall 24 or the ribs 22 and independent of the other.

In operation, when the flexible sleeve has deteriorated to the point at which replacement is required, the roller assembly is stopped. The bolts 38 are withdrawn from the holes 26, 32 and the locking plates are removed, permitting the pins 18 to fall from, or be removed from, the apertures 12. The worn sleeve assembly 9 is then slid off the mounting hub 20. A new sleeve assembly is then slid onto the ribs 22 of the mounting hub. The first end of a pin 18 is placed in a locking plate recess 34 and the other end of the pin is placed in a metal sleeve second aperture 12, while simultaneously the holes 26, 32 are aligned. A bolt 38 is then inserted in the holes 26, 32 and secured therein. The process is repeated for each locking plate, taking only a few seconds per plate. The process is then repeated for the other roller assembly of a twin roller assembly and the apparatus is ready to resume operations.

Figure 6:
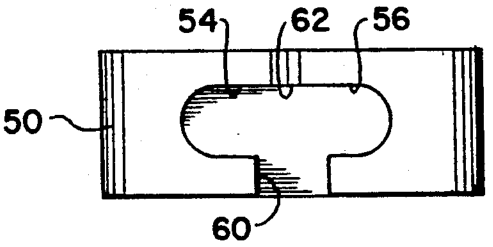
FIG. 6 is a top view of an alternative locking plate for the roller assembly.
Figure 7:
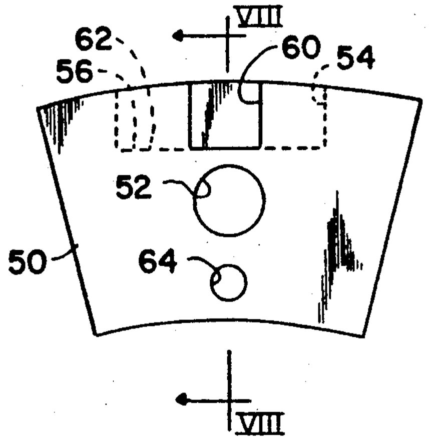
FIG. 7 is a front elevational view of the locking plate shown in FIG. 6.
Figure 8:
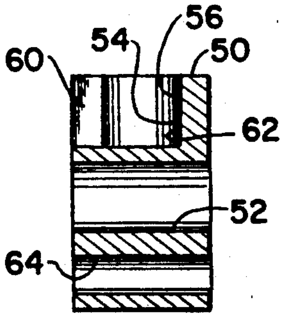
FIG. 8 is a sectional view of the alternative locking plate, taken along line VIII—VIII of FIG. 7.

Still further to decrease the "down time" necessary to effect changes of sleeve assemblies the locking plates 30 may comprise cam plates 50, illustrated in FIGS. 6–8. The cam plates 50 are provided with holes 52 adapted for alignment with the wall holes 26, and recess means 54, which are T-shaped slots 56. The slots 56 are provided with an entry/exit passageway 60, having a width substantially equal to, but no smaller than, the diameter of the pins 18, and a slideway 62 having a width somewhat exceeding the diameter of the pins 18. The cam plates 50 are provided with a second hole 64 to receive a retaining screw or bolt (not shown) to attach the cam plate 50 to the wall 24 at a second point to prevent rotation of the cam plate.

In operation, the cam plate 50 is secured to the wall 24 by the bolts 38 and retaining screws. A sleeve assembly 9, complete with pins 18, is slid onto the mounting hub 20 and rotated until the pins 18 are in alignment with the recess means passageway 60, at which point the sleeve assembly is urged axially so as to thrust the pins 18 through the passageway 60 and into the slideway 62. The sleeve assembly is then rotated in a direction opposite to the direction of rotation of the sleeve assembly in a shelling operation, until the pins 18 abut ends of the slideways 62. In a shelling operation, rotation of the sleeve assembly tends to maintain the pins 18 in position against the ends of the slideways 62. Because of the rotational forces, and because the widths of the passageways 60 are so closely equal to the diameters of the pins 18, accidental dislodgment of the pins from the slots 56 is remote.

Thus, when using the cam plates 50 to replace a worn sleeve assembly, the operator need only stop the machine, rotate the sleeve assembly to align the pins 18 with the passageways 60, and remove the worn sleeve assembly axially of the mounting hub 20. A new sleeve assembly is then slid onto the mounting hub, the pins 18 slid axially through the passageways 60 and into the slideways 62, and the sleeve assembly rotated slightly to seat the pins on the ends of the slideways.

In use of the aforementioned prior art rubber-surfaced rolls, it has been the custom to have the rubber sleeves of a relatively large (about one inch) wall thickness, in the expectation that because of rapid wear a wall thickness of an inch, or more, will provide substantial longevity before wearing out of the roll surface. However, it has been determined that a contributing factor to rapid wear of the rubber sleeves is the heat generated at the roll surface, which heat is not readily dissipated. It has been discovered that longevity can be enhanced by making the outer sleeve 4 of polyurethane and, rather than having a relatively thick walled sleeve, provide a relatively thin walled sleeve. The thin walled polyurethane sleeve 4 conducts heat rapidly to the metal sleeve 2 and thence to the atmosphere, as described above.

It has been found that a polyurethane sleeve thickness of about 0.5 inch, used in conjunction with an aluminum metal sleeve having a wall thickness of about 0.312 inch, provides a heat conduction rate in BTU/hour approximately twice the heat conduction rate of a one inch rubber sleeve used in conjunction with the same metal sleeve. A polyurethane sleeve having a wall thickness of 0.375 inch increases the heat conduction rate to almost three times that of the prior art one inch sleeve. The thinner sleeves, with higher heat conduction rates, actually provide increased life expectancy of the rolls, rather than a decreased active period, as has generally been believed.

Accordingly, using the above-described vane means 42 in conjunction with the exposed portions 16 of the outer sleeve 4 on the metal sleeve interior, further in conjunction with the increased cooling capacity as a result of providing a relatively thin-walled flexible outer sleeve 4, all contributes to a long-lived roller sleeve assembly 9 which substantially increases the life of the roller assembly. When replacement does fall due, the above-described locking plate embodiments 30, 50 offer quick and easy replacement.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. A method for making a roller assembly, the method comprising providing a round, tubular, rigid metal first sleeve, forming first and second apertures extending radially through said first sleeve, bonding a second sleeve to the entire exterior surface of said first sleeve with material of said second sleeve entering and filling said first apertures during said bonding, shielding said second apertures such that said material does not enter said second apertures during said bonding, and removing said shielding after said bonding, to provide a laminate sleeve assembly with parts of said second sleeve extending through said first sleeve to the interior surface of said first sleeve, and providing a mounting hub assembly comprising a circular wall having ribs extending from said wall and substantially normal thereto, sliding said sleeve assembly onto said ribs, providing locking plates adapted for connection to said wall and having recess means therein alignable with said sleeve assembly second apertures, locating pins in said locking plate recess means, disposing said locking plates such that said pins enter said sleeve assembly second apertures, and fixing said locking plates to said wall, whereby to connect said sleeve assembly to said mounting hub to form said roller assembly.

2. The method for making a roller assembly in accordance with claim 1 in which an inside surface of said laminate sleeve assembly is in part said first sleeve metal and in part said second sleeve material.

3. The method for making a roller assembly in accordance with claim 2 in which said first sleeve and said second sleeve are coextensive.

4. The method for making a roller assembly in accordance with claim 1 in which said mounting hub ribs extend axially of said first sleeve and slidably receive said first sleeve.

5. The method for making a roller assembly in accordance with claim 4 in which said wall is of an annular configuration.

6. The method for making a roller assembly in accordance with claim 1 in which said second sleeve is a polyurethane sleeve having a wall thickness of about 0.375 to 0.5 inch.

7. The method for making a roller assembly in accordance with claim 6 in which said first sleeve is of aluminum and has a wall thickness of about 0.3 inch.

8. The method for making a roller assembly in accordance with claim 5 in which said ribs extend from said annular wall to define a circumference adapted to slidably receive said first sleeve, and portions of said ribs extend inwardly of said assembly and form vane means.

9. A method for making a roller assembly, the method comprising providing a rigid metal first sleeve, forming first and second apertures extending radially through said first sleeve, bonding a second sleeve to the substantially entire exterior surface of said first sleeve with material of said second sleeve entering and filling said first aperture during said bonding, providing a mounting hub assembly comprising a wall having ribs extending therefrom, said ribs being disposed in circular fashion and adapted to slidingly receive said first sleeve, and providing means on said hub assembly for locking said first sleeve onto said hub assembly, said locking means including pin means adapted to extend into said second aperture of said first sleeve.

* * * * *